Feb. 15, 1955 A. W. FRIEND 2,702,316

SIGNAL MODULATION SYSTEM

Filed Feb. 28, 1951 2 Sheets-Sheet 1

INVENTOR

Albert W. Friend

BY H. Newton

ATTORNEY

INVENTOR
Albert W. Friend
BY H. Newton (signature)
ATTORNEY 2,702,316

SIGNAL MODULATION SYSTEM

Albert W. Friend, Princeton, N. J., assignor to Radio Corporation of America, a corporation of Delaware Application February 28, 1951, Serial No. 213,206

14 Claims. (Cl. 179—100.2)

This invention relates generally to signal modulation systems and methods, and particularly relates to a signal modulator, signal mixer or frequency converter, or to a system for reproducing a magnetic record, and to a method of modulating a carrier wave.

Semi-conductor amplifiers of the transistor type are well known. A transistor amplifier includes a semi-conducting body such as a germanium crystal and at least three electrodes in contact with the crystal. The base electrode is in low-resistance contact with the crystal while the emitter and collector electrodes are in rectifying contact therewith. Usually the input signal is impressed between emitter and base and an amplified output signal is derived between collector and base. It is also well known that the gain of a transistor amplifier normally decreases appreciably at frequencies above a few megacycles. This effect is produced by a transit time phenomena, that is, by the finite time which a charge carrier requires to travel between emitter and collector. The charge carriers may consist of electrons or holes depending upon the polarity of the applied field and on the particular material used, that is, whether the semi-conducting material is N type or P type. Different charge carriers normally travel over paths of different lengths and accordingly at high frequencies there may be a difference in phase between different charge carriers which may produce a decrease of the current gain, a decrease of the signal amplitude and an increase of the phase shift between input and output currents.

In order to overcome these effects and to provide a transistor amplifier which is operable at frequencies of the order of 20 megacycles, it has been proposed by C. Bradner Brown (see "Phys. Rev.," page 1736, vol. 76, December 1, 1949, and "Electronics," July 1950, pages 81 to 83) to apply a magnetic field in a direction substantially transverse to the direction of flow of the charge carriers within the crystal and between the emitter and collector electrodes. By the application of a magnetic field in a suitable direction or polarity the path lengths of the charge carriers can be reduced or equalized by forcing them to travel over the shortest path between emitter and collector, whereby the above discussed transit time phenomena are effectively reduced. Thus, the current gain remains high at higher frequencies and the phase shift remains smaller by the application of such a magnetic field. In accordance with the present invention such a magnetic field is utilized to modulate a carrier wave with a signal.

It is accordingly an object of the present invention to provide improved signal modulation systems such as a signal modulator, a signal mixer or frequency converter, or a magnetic record reproducing system which includes a transistor and wherein a magnetic field is utilized for modulating a carrier wave impressed on the transistor.

A further object of the invention is to provide a method of modulating the path lengths of charge carriers which flow under the influence of an electric field through the semi-conducting material and between the rectifying electrodes of a transistor.

Another object of the invention is to modulate the amplitude of a carrier wave or its phase or both in accordance with a signal; the carrier wave may also be modulated or mixed with another carrier wave so as to obtain a modulation or a frequency conversion systems.

In accordance with the present invention, it is also feasible to provide a playback head for reproducing magnetic recordings on a moving medium such as a tape or a wire. A conventional playback head for magnetic records consists of a ferromagnetic core structure upon which are wound one or usually two inductor coils. The core has a magnetic pick-up or front gap with which the magnetic tape or wire is scanned and usually a back gap to provide a symmetrical structure and to minimize sensitivity to undesired external magnetic fields. The magnetic field developed by the moving tape or wire induces a current in the inductor coils. Accordingly, the relative amplitude of the output signal is proportional to the frequency of the recorded signal and is shifted in phase by 90 degrees with respect to the original signal. Therefore, it is necessary to compensate for the phase shift and for the undesired frequency response of the output signal by emphasizing the low frequency components with respect to the high frequency components. The effect is that the signal-to-noise ratio particularly for the low frequency components of the recorded signal is quite low.

Accordingly, it is still a further object of the present invention to provide an improved magnetic playback head of small size which will reproduce substantially without distortion a signal recorded on a magnetic carrier such as a tape.

A signal modulation system in accordance with the present invention comprises a transistor. The input signal is impressed between emitter and base and the amplified output signal is derived between collector and base. In accordance with the present invention, a magnetic field is applied substantially transverse to the direction of flow of charge carriers moving between emitter and collector. This magnetic field is varied or modulated in accordance with a modulation signal so that the amplitude and phase of the amplitude output signal is varied or modulated in accordance with the modulation signal. If the signal to be amplified is an unmodulated carrier wave, that is, a carrier wave of substantially constant amplitude and frequency, the amplified output wave is modulated in accordance with the magnetic modulation signal. It is also feasible to impress a modulated carrier wave on the transistor and to modulate the magnetic field in accordance with an oscillatory wave of predetermined frequency. In this case the signal modulation system of the invention provides signal mixing or frequency conversion so that the output signal consists of the modulation products of the applied modulated carrier wave and of the modulation of the magnetic field in accordance with an oscillatory wave.

The output signal derived from the transistor may be passed through an amplitude limiter to remove amplitude modulations so that the ouput signal is only phase modulated. On the other hand, it is feasible to remove the phase modulations by passing the output signal through a suitable phase correction network which may, for example, consist of a detuned resonant circuit.

In accordance with the present invention the variations of the magnetic field may also be produced by the movement of a magnetic record such as a tape moving past a playback head including a transistor. In that case, the carrier wave impressed on the transistor will have its amplitude and phase modulated in accordance with the magnetic field developed by the moving record.

The use of a carrier wave has the advantage of reducing the inherent noise of a transistor which is proportional to the reciprocal of the signal frequency. Thus, by using a carrier wave which may have a frequency of the order of a megacycle, the inherent noise of the transistor becomes quite low.

The novel features that are considered characteristic of this invention are set forth with particularity in the appended claims. The invention itself, however, both as to its organizations and method of operation, as well as additional objects and advantages thereof, will best be understood from the following description when read in connection with the accompanying drawings, in which:

Figure 1:
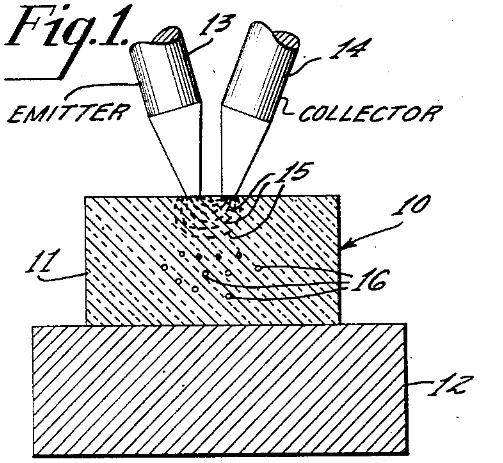
Figure 1 is a side elevational view, partly in section, of a transistor illustrating schematically the effect of a magnetic field on the paths of the charge carriers.

Referring now to the drawings, in which like components have been designated by the same reference numerals, and particularly to Figure 1, there is illustrated schematically a semi-conductor device 10 such as a transistor. The device 10 comprises a semi-conducting body 11 which may, for example, consist of silicon or preferably of germanium and which may be of the N type; it is, of course, to be understood that semi-conducting bodies of the P type may also be used. The upper surface of body 11 may be polished and etched as is conventional. A base electrode 12 is in low-resistance contact with body 11. Usually the base electrode 12 is a large-area electrode such as a block of metal and may be soldered or sweated to body 11 to provide the required low-resistance between the base 12 and the body 11.

A pair of rectifying electrodes 13 and 14 is in contact with the upper surface of body 11. Rectifying electrode 13 may be the emitter and rectifying electrode 14 may be the collector. Rectifying electrode 13, 14 may consist of fine wires which may have a diameter of 5 mils, for example, and which may be ground to a fine point as shown in Figure 1. However, it is also feasible to provide rectifying electrodes which are in line contact with body 11 or even in large-area contact provided they make rectifying contact with the body.

When suitable operating potentials are applied to the electrodes 12 to 14, charge carriers travel through the body 11. For transistor operation, a voltage in the forward direction is impressed between emitter 13 and base 12 and a voltage in the reverse direction is applied between collector 14 and base 12. If body 11 is of the N type, the emitter 13 should be positive and the collector 14 negative with respect to base 12. If the body should be of the P type, the potentials must be reversed. For the further discussion it may be assumed that body 11 is of the N type.

In that case, holes will travel from emitter 13 to collector 14 along paths of different lengths indicated at 15 in Figure 1. Due to the difference of the path lengths of the charge carriers, the transistor has certain transit time phenomena as previously explained. Thus, at high frequencies of the order of several megacycles, the current gain decreases and the phase shift or phase angle between input and output currents increases. This effect may be minimized by applying a magnetic field substantially transverse to the direction or flow of the charge carriers between emitter 13 and collector 14. The magnetic field is schematically indicated by the small circles 16 and extends perpendicular to the plane of the drawing. When the magnetic field is applied in the right direction or with the correct polarity, the length of the longest paths of the charge carriers is reduced, that is, the charge carriers are forced to flow along a thin surface layer of the body 11 between electrodes 13, 14.

Figure 2:
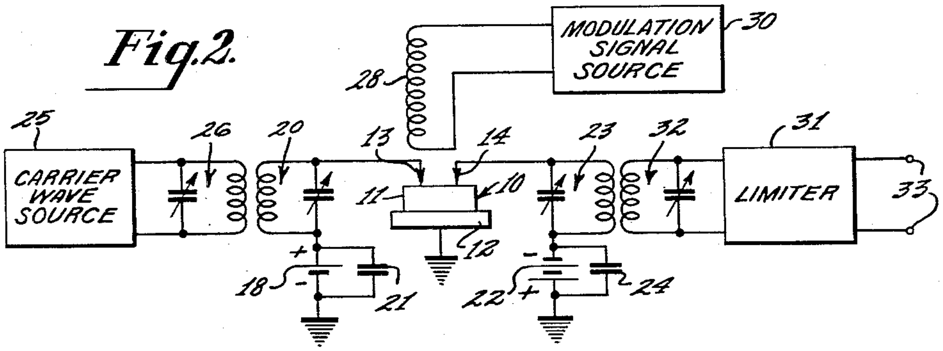
Figure 2 is a circuit diagram of a signal modulation system embodying the invention.

In accordance with the present invention, this effect is utilized to modulate a carrier wave or to mix one signal with another signal. A signal modulation system in accordance with the present invention is illustrated in Figure 2. The system of Figure 2 includes semi-conductor device 10 which may be identical with that illustrated in Figure 1. The base electrode 12 may be grounded as shown. A potential in the forward direction is applied between emitter 13 and base 12 by a suitable source of voltage such as battery 18 having its negative terminal grounded. The positive terminal of battery 18 is connected to emitter 13 through parallel resonant circuit 20. Battery 18 may be bypassed for signal frequency currents by capacitor 21.

For the purpose of applying a bias potential in the reverse direction between collector 14 and base 12, there may be provided a suitable source of voltage such as battery 22 having its positive terminal grounded. The negative terminal of battery 22 is connected to collector 14 through parallel resonant output circuit 23. Battery 22 may be bypassed for signal frequency currents by capacitor 24.

An unmodulated carrier wave may be developed by carrier wave source 25. In other words the carrier wave developed by source 25 should have substantially constant amplitude and frequency. The carrier wave is impressed on parallel resonant circuit 26 connected to the output of source 25 and inductively coupled to input circuit 20. The carrier wave is accordingly impressed between emitter 13 and base 12. An amplified output signal is developed across parallel resonant output circuit 23, that is, between collector 14 and base 12. The operation of the amplifier described so far is entirely conventional so that further explanation is not believed to be necessary.

In accordance with the present invention a magnetic field is developed, for example, by inductor 28, which is arranged in such a manner with respect to body 11 that the magnetic lines of force are substantially transverse to the direction of flow of the charge carriers between emitter 13 and collector 14. The magnetic field developed by inductor 28 is modulated by modulation signal source 30 in accordance with a modulation signal. It is, of course, to be understood that an additional constant magnetic bias field may be applied to semi-conductor device 10. To this end, a constant direct current may be caused to flow through inductor 28. Alternatively, a permanent magnet may be provided or another inductor through which a constant direct current is caused to flow. In any case, however, the magnitude of the magnetic field is modulated in accordance with the modulation signal developed by source 30.

Due to the variation or modulation of the magnetic field applied transverse to the flow of the charge carriers between emitter 13 and collector 14, the carrier wave which is developed in output circuit 23 has its phase modulated or varied in accordance with the modulation signal due to the phase modulation between the input and output currents. It will be obvious that the amplitude of the output wave will also be modulated; this is caused by the phase difference of the charge carriers which travel over the paths 15 of different lengths. In certain cases the phase modulation may be so small as to be negligible. Thus, if the phase shift is less than 0.1 radian, the phase modulation component may be neglected. On the other hand, if it is desired to obtain a phase modulated output wave, the amplitude modulation of the output wave should be removed. To this end there may be provided a conventional amplitude limiter 31 having a parallel resonant input circuit 32 which is coupled to the output circuit 23 of the transistor amplifier. The phase modulated output wave which has substantially no amplitude modulation may now be obtained from output terminals 33 of the limiter 31.

Figure 3:
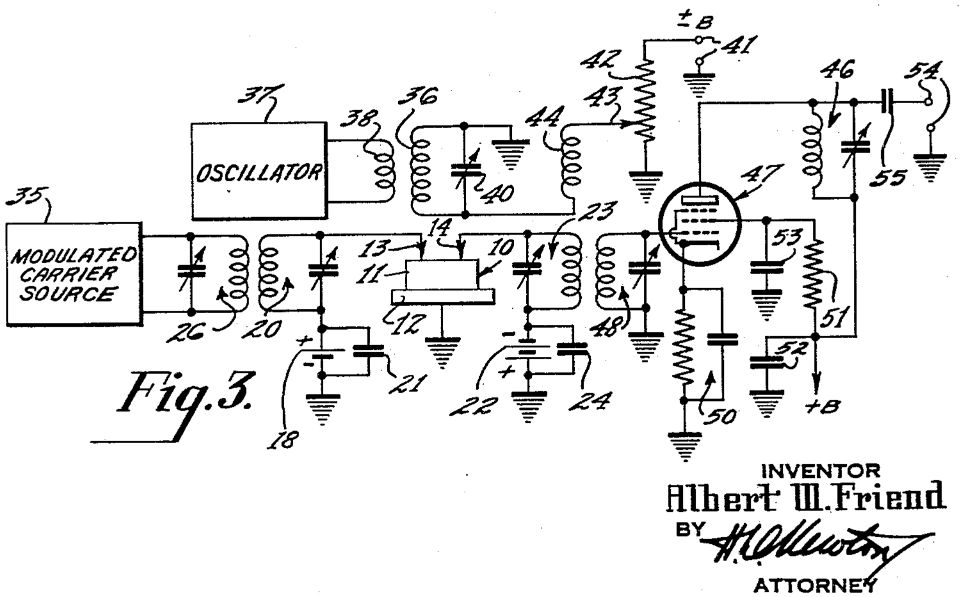
Figure 3 is a circuit diagram of a frequency conversion system in accordance with the invention.

Instead of modulating the amplitude or phase, or both, of an unmodulated carrier wave in accordance with a modulation signal, it is also feasible to modulate a modulated carrier wave in accordance with an oscillatory wave of predetermined constant amplitude and frequency. Such a frequency conversion system in accordance with the invention is illustrated in Figure 3. The system of Figure 3 includes a modulated carrier wave source 35. The modulated carrier wave developed by source 35 may be a broadcast carrier wave or any other modulated carrier wave. The modulated carrier wave is impressed on resonant circuit 26 and consequently on emitter 13, and the amplified output wave is obtained from output circuit 23 in the manner previously explained.

The magnetic field is developed by inductor 36 which is positioned again so that the magnetic lines of force are substantially transverse to the direction of flow of the charge carriers between emitter 13 and collector 14. An oscillator indicated at 37 develops an oscillatory wave of substantially constant frequency and amplitude and the oscillatory wave is impressed on inductor 38 inductively coupled to inductor 36. Inductor 36 may be tuned by a capacitor 40 as shown and its upper terminal may be grounded. A constant direct current may be caused to flow through inductor 36. To this end, a suitable source of positive or negative voltages may be connected across terminals 41 across which resistor 42 is connected. By means of adjustable tap 43, an adjustable direct current voltage of either positive or negative polarity may be obtained and may be applied across inductor 36 through choke coil 44. However, it is to be understood that it may not be necessary in all cases to provide flow of a constant direct current through inductor 36 to develop a constant magnetic field.

The amplified output wave developed in output circuit 23 now represents the modulation products of the modulated carrier wave developed by source 35 and of the oscillatory wave developed by oscillator 37. Resonant output circuit 23 may be tuned to the frequency of the desired output wave, which may, for example, be the sum or the difference of the frequency of the carrier wave and of that of the oscillatory wave. This output wave will have again its amplitude modulated as well as its phase modulated in accordance with the oscillatory wave. If it is desired to obtain an output wave which has its phase modulated by the modulations of the magnetic field, an amplitude limiter such as shown at 32, 31 in Figure 2 may be coupled to output circuit 23.

However, if it is desired to provide an output wave without phase modulation but with amplitude modulation, a phase correction network 46 may be coupled to output circuit 23 through a vacuum tube amplifier 47. A parallel resonant circuit 48 may be inductively coupled to output circuit 23 and may be connected between the control grid of the amplifier 47 and ground. The cathode of amplifier 47 may be grounded through a bias network 50. The suppressor grid may be connected to the cathode as shown and the screen grid may be connected to a suitable source of anode voltage indicated at +B through dropping resistor 51. Both terminals of dropping resistor 51 may be bypassed to ground for signal frequency currents through capacitors 52 and 53, capacitor 52 being included to bypass to ground the lower terminals of resonant circuit 46. The anode of amplifier 47 is connected to +B through the phase correction network 46.

The amplifier 47 has a pair of high impedance output terminals, that is, its anode and ground. The phase correction network 46 may simply be a parallel resonant circuit which is tuned to a frequency different from that of the amplified carrier wave. The output signal may be obtained from output terminals 54, one of which is grounded while the other one is coupled to the anode of amplifier 47 through blocking capacitor 55.

Figure 4:
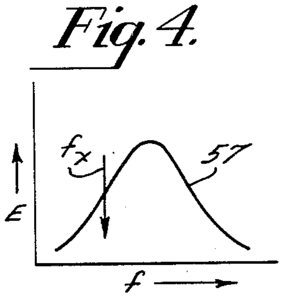
Figure 4 is a graph illustrating the operation of a phase correction network included in the system of Figure 3.

The operation of the detuned circuit 46 is well understood and may be explained by reference to Figure 4. Curve 57 of Figure 4 shows the relationship between the voltage E developed across the phase correction network 46 and the frequency $f$ of the applied signal or carrier wave. If the frequency of the carrier wave amounts to $f_x$ as shown in Figure 4, small variations of the phase of the output wave may be removed and will simultaneously be transformed into amplitude variations, thereby to increase the effective amplitude modulation of the output wave. It is, of course, to be understood that other conventional phase correction networks may be substituted for the network 46 in Figure 3.

The output wave obtained from output terminals 54 accordingly has substantially constant phase, while its amplitude is modulated in accordance with the modulations of the applied magnetic field. If the phase modulation is smaller than ¼ radian, the phase correction network may be omitted.

It is also feasible to obtain a carrier wave from the system of Figure 2 which has its frequency modulated in accordance with a modulation signal. In that case, the modulation signal voltage should first be passed through a suitable network which has an output proportional to the reciprocal of the signal frequency. Consequently, the frequency of the output wave obtained from terminals 33 will be directly proportional to the modulation signal as is well known.

Figure 5:
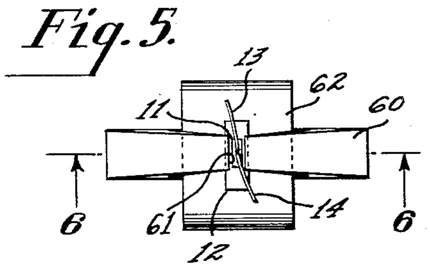
Figure 5 is a plan view of a signal modulator in accordance with the invention.
Figure 6:
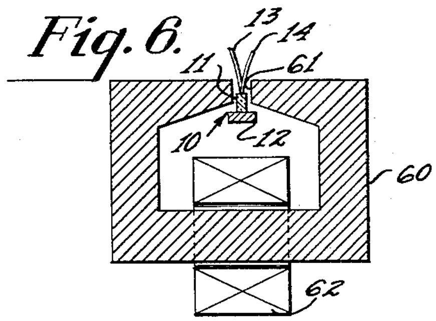
Figure 6 is a sectional view of the device of Figure 5 taken on line 6—6 of Figure 5.

A signal modulation device in accordance with the present invention is illustrated, by way of example, in Figures 5 and 6. The signal modulation device which may be used with the system of Figure 2 or 3 again comprises a semi-conductor device 10 including a semi-conducting body or crystal 11 and a base 12, an emitter 13 and a collector 14 in contact therewith. A ferro-magnetic core 60 is provided with a gap 61 within which the body 11 and the rectifying electrodes 13, 14 are provided. The body 11 is disposed in the gap 61 in such a manner that the magnetic field developed by the exciting inductor coil 62 extends again substantially transverse to the path of charge carriers flowing between the rectifying electrodes 13 and 14.

Ferromagnetic core 60 may, for example, consist of ferrite, of metal powder moldings or of laminations of suitable ferromagnetic metal depending upon the frequency of the modulation signal. In other words, for audio frequencies laminations may suffice but for the higher frequencies an iron dust or ferrite molded core may be used to advantage. It is to be understood that the inductor 62 of Figures 5 and 6 corresponds to the inductor 28 of Figure 2 or to the inductor 36 of Figure 3. The operation of the device of Figures 5 and 6 will be evident from the previous discussion.

Figure 7:
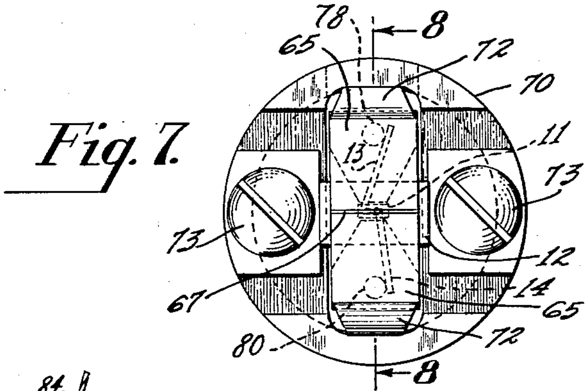
Figure 7 is a plan view of a playback head embodying the present invention.
Figure 8:
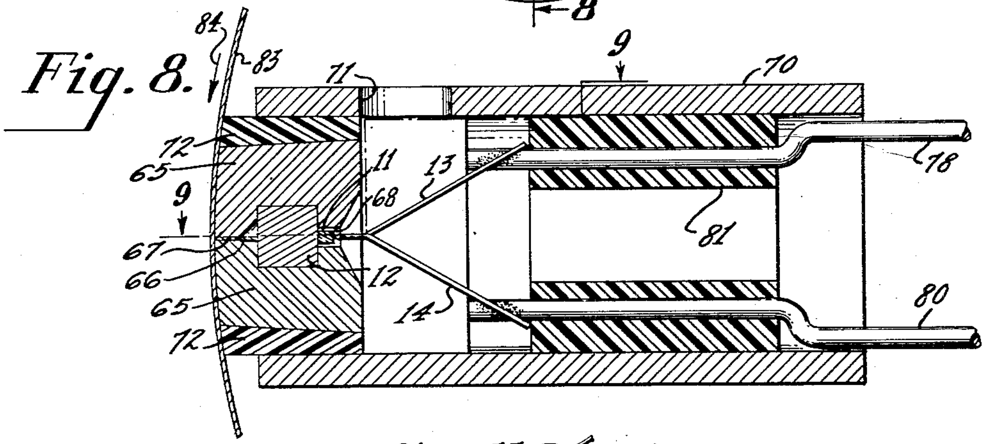
Figure 8 is a sectional view of the playback head of Figure 7 taken on line 8—8 of Figure 7.
Figure 9:
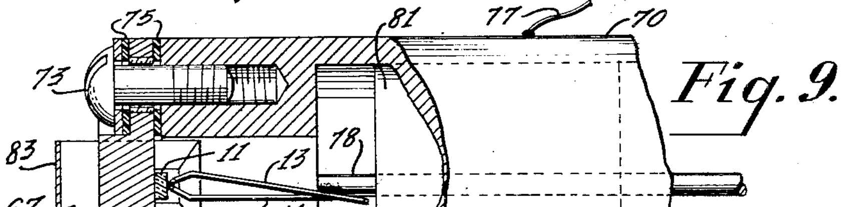
Figure 9 is a sectional view, partly in elevation, of the playback head of Figure 7 taken on line 9—9 of Figure 8.

By way of example, a playback head in accordance with the present invention for reproducing the magnetic recordings on a magnetic carrier such as a tape or a wire has been illustrated in Figures 7 to 9. The playback head again includes a semi-conductor device having a semi-conducting body 11, a base electrode 12 and two rectifying electrodes 13, 14. A ferromagnetic core 65, 65 which may consist of two portions as illustrated is disposed about base electrode 12, crystal 11 and rectifying electrodes 13, 14. Base electrode 12 consists essentially of an elongated bar of a non-magnetic metal having a good electric conductivity such, for example, as copper. Thus, base electrode 12 extends through the two portions of core 65.

Core 65 may be made of ferrite or of ferromagnetic metal laminations, for example. The core includes a front gap 66 within which is disposed a non-magnetic thin spacer 67 which may, for example, consist of a sheet of beryllium copper. A somewhat wider gap 68 is provided opposite gap 66 within which the body 11 is disposed. A housing 70 is disposed about core 65 and the semi-conductor device. The housing 70 also consists of a non-magnetic electrically conducting metal such as brass. Housing 70 is provided with an aperture 71 through which the semi-conducting device may be observed. A pair of wedges 72 which may consist of Bakelite are provided between housing 70 and magnetic core pieces 65, 65 to squeeze together the pole pieces 65, 65 and, if desired, to insulate electrically the housing from the core pieces and also from base electrode 12.

As shown particularly in Figure 9, a pair of screws 73, 73 are screwed into suitable threaded openings 74 of housing 70 and engage with base electrode 12. A pair of insulating washers 75 is provided between base electrode 12 and one of the screws 73 thereby to insulate the housing 70 from base electrode 12. The other screw 73 has a pair of metallic washers 76 to provide an electrical connection between base electrode 12 and housing 70. A terminal lead 77 may be connected to housing 70.

The rectifying electrodes 13, 14 are welded to terminal wires 78, 80 respectively, which extend through an insulating cylinder 81 which has a press fit within housing 70.

After the core pieces 65, 65 are assembled about base electrode 12 and crystal 11, the rectifying electrodes 13, 14 are engaged with the upper surface of the semi-conducting body 11 by pressing insulating cylinder 81 against the semi-conducting body 11. Through aperture 71 the contact between the rectifying electrodes 13, 14 and body 11 may be observed. The magnetic tape 83 moves in the direction shown by arrow 84 in Figure 8 past the front gap 66 so that a magnetic field is developed substantially transverse to the direction of flow of charge carriers between the rectifying electrodes 13, 14.

The playback head of Figures 7 to 9 may be used in the circuit or system of Figure 2. In this case, however, the magnetic field is developed by the moving magnetic tape 83 and the magnetic core 65, 65 instead of by the inductor 28 as shown in Figure 2. If the base electrode 12 were electrically connected to housing 70 through both screws 73 a short-circuited inductor turn would be provided about the magnetic circuit which would prevent the correct operating conditions. It is also to be understood that the outer surface of the core pieces 65, 65 should be polished smooth for contact with the magnetic tape 83.

If it is desired to use a magnetic wire rather than a magnetic tape, a small groove may be ground along the arc of core pieces 65, 65 to guide the wire and to provide a better magnetic contact with the wire surface.

For the magnetic playback head of Figures 7 to 9 a correction of the phase modulation will usually not be necessary. The modulated carrier wave derived from the playback head of Figures 7 to 9 may, for example, be reproduced by a conventional broadcast receiver. The output wave derived from the playback head of the invention has substantially no amplitude or phase distortion with respect to the recorded magnetic signal. The only correction required is for the characteristics of the record medium and the geometry of the pick-up gap 66.

There have thus been disclosed improved signal modulation systems whereby the amplitude or phase, or both, of a carrier wave may be modulated in accordance with modulation signal which is utilized to modulate the magnitude of a magnetic field. The device may be used for modulating an unmodulated carrier wave, for mixing two signals or for converting the frequency of a modulated carrier wave in accordance with an oscillatory wave. In accordance with the invention, an improved magnetic playback head is provided which overcomes some of the drawbacks of prior art playback heads.

What is claimed is:

1. A signal modulation system comprising a semiconductor device including a semi-conducting body, a base electrode in low resistance contact with one surface of said body, an emitter electrode and a collector electrode in contact with a second surface of said body, said surface being in parallel relation, means for applying operating potentials to said electrodes to establish an electric field along a first predetermined axis, means for impressing an input signal between said emitter and base electrodes to provide a flow of charge carriers between said emitter and collector electrodes along a second axis substantially normal to said first axis, means for deriving an amplified output signal between said collector and base electrodes, and means for applying a varying magnetic field to said device along a third axis substantially transverse to each of said first and second axes, thereby to vary said amplified output signal.

2. A signal modulation system comprising a semiconductor device including a semi-conducting body, a base electrode in low resistance contact with one surface of said body, an emitter electrode and a collector electrode in rectifying contact with a second surface of said body, said surface being in parallel relation, means for applying operating potentials to said electrodes to establish an electric field along a first predetermined axis, means for impressing a carrier wave between said emitter and base electrodes to provide a flow of charge carriers between said emitter and collector electrodes along a second axis substantially normal to said first axis, means for deriving an amplified carrier wave between said collector and base electrodes, and means for applying a varying magnetic field to said device along a third axis substantially transverse to each of said first and second axes, thereby to vary the amplitude and phase of said amplified carrier wave.

3. A signal modulation system comprising a semiconductor device including a semi-conducting body, a base electrode in low resistance contact with one surface of said body, an emitter electrode and a collector electrode in rectifying contact with a second surface of said body, said surface being in parallel relation, means for applying operating potentials to said electrodes to establish an electric field along a first predetermined axis, means for impressing an input signal between said emitter and base electrodes to provide a flow of charge carriers between said emitter and collector electrodes along a second axis substantially normal to said first axis, means for deriving an amplified output signal between said collector and base electrodes, means for applying a magnetic field to said device along a third axis substantially transverse to each of said first and second axes, and means for modulating said magnetic field in accordance with a modulation signal, thereby to modulate said amplified output signal.

4. A signal modulation system comprising a semiconductor device including a semi-conducting body, a base electrode in low resistance contact with one surface of said body, an emitter electrode and a collector electrode in rectifying contact with a second surface of said body, said surface being in parallel relation, means for applying operating potentials to said electrodes to establish an electric field along a first predetermined axis, means for impressing a carrier wave between said emitter and base electrodes to provide a flow of charge carriers between said emitter and collector electrodes along a second axis substantially normal to said first axis, means for deriving an amplified carrier wave between said collector and base electrodes, means for applying a magnetic field to said device along a third axis substantially transverse to each of said first and second axes, and means for modulating said magnetic field in accordance with a modulation signal, thereby to modulate the amplitude and phase of said amplified carrier wave in accordance with said modulation signal.

5. A signal modulation system comprising a semiconductor device including a semi-conducting body, a base electrode in low resistance contact with one surface of said body, an emitter electrode and a collector electrode in rectifying contact with a second surface of said body, said surface being in parallel relation, means for applying operating potentials to said electrodes to establish an electric field along a first predetermined axis, a carrier wave source, said carrier wave having substantially constant amplitude and frequency, means for coupling said carrier wave source between said emitter and base electrodes to provide a flow of charge carriers between said emitter and collector electrodes along a second axis substantially normal to said first axis, means for applying a magnetic field to said device along a third axis substantially transverse to each of said first and second axes, means for modulating the magnitude of said magnetic field in accordance with a modulation signal, an output circuit coupled between said collector and base electrodes for developing an amplified carrier wave having its amplitude and phase modulated in accordance with said modulation signal, and an amplitude limiter coupled to said output circuit for deriving therefrom a carrier wave of substantially constant amplitude and of a phase modulated in accordance with said modulation signal.

6. A signal modulation system comprising a semiconductor device including a semi-conducting body, a base electrode in low resistance contact with one surface of said body, an emitter electrode and a collector electrode in rectifying contact with a second surface of said body, said surface being in parallel relation, means for applying operating potentials to said electrodes to establish an electric field along a first predetermined axis, a carrier wave source, said carrier wave having substantially constant amplitude and frequency, means for coupling said carrier wave source between said emitter and base electrodes to provide a flow of charge carriers between said emitter and collector electrodes along a second axis substantially normal to said first axis, means for applying a magnetic field to said device along a third axis substantially transverse to each of said first and second axes, means for modulating the magnitude of said magnetic field in accordance with a modulation signal, an output circuit coupled between said collector and base electrodes for developing an amplified carrier wave having its amplitude and phase modulated in accordance with said modulation signal, and a phase correction network coupled to said output circuit for deriving therefrom a carrier wave of substantially constant phase and of an amplitude modulated in accordance with said modulation signal.

7. A signal modulation system comprising a semi-conductor device including a semi-conducting body, a base electrode in low resistance contact with one surface of said body, an emitter electrode and a collector electrode in contact with a second surface of said body, said surface being in parallel relation, means for applying operating potentials to said electrodes to establish an electric field along a first predetermined axis, a carrier wave source, said carrier wave having substantially constant amplitude and frequency, means for coupling said carrier wave source between said emitter and base electrodes to provide a flow of charge carriers between said emitter and collector electrodes along a second axis substantially normal to said first axis, means for applying a magnetic field to said device along a third axis substantially transverse to each of said first and second axes, means for modulating the magnitude of said magnetic field in accordance with a modulation signal, a signal circuit coupled between said collector and base electrodes for developing an amplified carrier wave having its amplitude and phase modulated in accordance with said modulation signal, an amplifier coupled to said signal circuit and having high impedance output terminals, and a phase correction network coupled between said amplifier output terminals for deriving therefrom an amplified carrier wave of substantially constant phase and of an amplitude modulated in accordance with said modulation signal.

8. A frequency converter comprising a semi-conductor device including a semi-conducting body, a base electrode, in low resistance contact with one surface of said body, an emitter electrode and a collector electrode in contact with a second surface of said body, said surface being in parallel relation, means for applying operating potentials to said electrodes to establish an electric field along a first predetermined axis, a modulated carrier wave source coupled between said emitter and base electrodes to provide a flow of charge carriers between said emitter and collector electrodes along a second axis substantially normal to said first axis, means for applying a magnetic field to said device along a third axis substantially transverse to each of said first and second axes, the magnitude of said magnetic field being modulated in accordance with an oscillatory wave of substantially constant predetermined frequency, and an output circuit coupled between said collector and base electrodes to derive an amplified wave including the modulation products of said modulated carrier wave and of said oscillatory wave.

9. A frequency converter comprising a semi-conductor device including a semi-conducting body, a base electrode, in low resistance contact with one surface of said body an emitter electrode and a collector electrode in rectifying contact with a second surface of said body, said surface being in parallel relation, means for applying operating potentials to said electrodes to establish an electric field along a first predetermined axis, an amplitude-modulated carrier wave source coupled between said emitter and base electrodes to provide a flow of charge carriers between said emitter and collector electrodes along a second axis substantially normal to said first axis, means for applying a magnetic field along a third axis substantially transverse to each of said first and second axes, means for modulating the magnitude of said magnetic field in accordance with an oscillatory wave of substantially constant predetermined frequency, and an output circuit coupled between said collector and base electrodes to derive an amplified wave including the modulation products of said amplitude-modulated carrier wave and of said oscillatory wave.

10. A frequency converter comprising a semi-conductor device including a semi-conducting body, a base electrode, in low resistance contact with one surface of said body, an emitter electrode and a collector electrode in rectifying contact with a second surface of said body, said surface being in parallel relation, means for applying operating potentials to said electrodes to establish an electric field along a first predetermined axis, a modulated carrier wave source coupled between said emitter and base electrodes to provide a flow of charge carriers between said emitter and collector electrodes along a second axis substantially normal to said first axis, means for applying a magnetic field to said device along a third axis substantially transverse to each of said first and second axes, means for modulating the magnitude of said magnetic field in accordance with an oscillatory wave of substantially constant predetermined frequency, a signal circuit coupled between said collector and base electrodes, an amplifier coupled to said signal circuit, said amplifier having a high impedance output terminals, and a phase correction network coupled between said amplifier output terminals for developing a beat frequency wave which is the modulation product of said modulated carrier wave and of said oscillatory wave and having substantially constant phase.

11. A signal modulation device comprising a semi-conducting body having two surfaces disposed substantially opposite each other, a base electrode in low-resistance contact with one of said surfaces, an emitter electrode and a collector electrode in rectifying contact with the other one of said surfaces, a ferromagnetic core having a gap, said emitter and collector electrodes and said body being disposed substantially within said gap, and a winding disposed about said core, said core being adapted to develop a varying magnetic field across said gap upon the flow of a varying electric current through said winding, said body being disposed in said gap so that said magnetic field extends substantially transverse to the path of charge carriers flowing between said emitter and collector electrodes and in such a manner as to shorten or lengthen the path of said charge carriers between said emitter and collector electrodes.

12. A signal modulation device comprising a semi-conducting body having two substantially plane surfaces disposed substantially opposite each other, a base electrode in low-resistance contact with one of said surfaces, an emitter electrode and a collector electrode in rectifying contact with the other one of said surfaces, a ferromagnetic core having a gap, said emitter and collector electrodes and said body being substantially disposed within said gap, said gap extending substantially parallel to a plane passing through the contacts between said emitter and collector electrodes and said body and substantially transverse to said surfaces, and a winding disposed about said core, said core being adapted to develop a varying magnetic field across said gap upon the flow of a varying electric current through said winding.

13. A playback head for reproducing signals from a movable elongated member bearing magnetic recordings thereon, said head comprising a semi-conductor device including a semi-conducting body having two opposed surfaces, a base electrode in low-resistance contact with one of said surfaces, said base electrode consisting of a non-magnetic metal, an emitter electrode and a collector electrode in rectifying contact with the other one of said surfaces, a ferromagnetic core surrounding substantially said body and said base electrode, and said core having a magnetic gap extending substantially in the plane passing through the contacts between said emitter and collector electrodes and said body and substantially transverse to said surfaces, whereby a varying magnetic field is developed substantially transverse to the direction of flow of charge carriers between said emitter and collector electrodes upon the movement of the magnetic member across said gap.

14. A play back head for reproducing signals from a magnetic tape comprising a semi-conductor device including a semi-conducting body having two opposed substantially plane surfaces, a base electrode in low-resistance contact with one of said surfaces, said base electrode consisting of a non-magnetic metal, an emitter electrode and a collector electrode in rectifying contact with the other one of said surfaces, a ferromagnetic core surrounding substantially said body and said base electrode, said core having a magnetic gap extending substantially in the plane passing through the contacts between said emitter and collector electrodes and said body and substantially transverse to said surfaces, a housing of a non-magnetic metal surrounding said core, said electrodes and said body, means electrically insulating said housing from said core, and means providing an electrical connection between said base electrode and said housing, whereby a varying magnetic field is developed substantially transverse to the direction of flow of charge carriers between said emitter and collector electrodes upon the movement of the magnetic tape across said gap.

References Cited in the file of this patent

UNITED STATES PATENTS

| | | |
|---|---|---|
| 2,476,323 | Rack | July 19, 1949 |
| 2,486,776 | Barney | Nov. 1, 1949 |
| 2,553,490 | Wallace | May 15, 1951 |
| 2,570,939 | Goodrich, Jr. | Oct. 9, 1951 |